O. W. YOUNG.
THROTTLE VALVE.
APPLICATION FILED JAN. 15, 1915.
1,304,724.
Patented May 27, 1919.
2 SHEETS—SHEET 1.
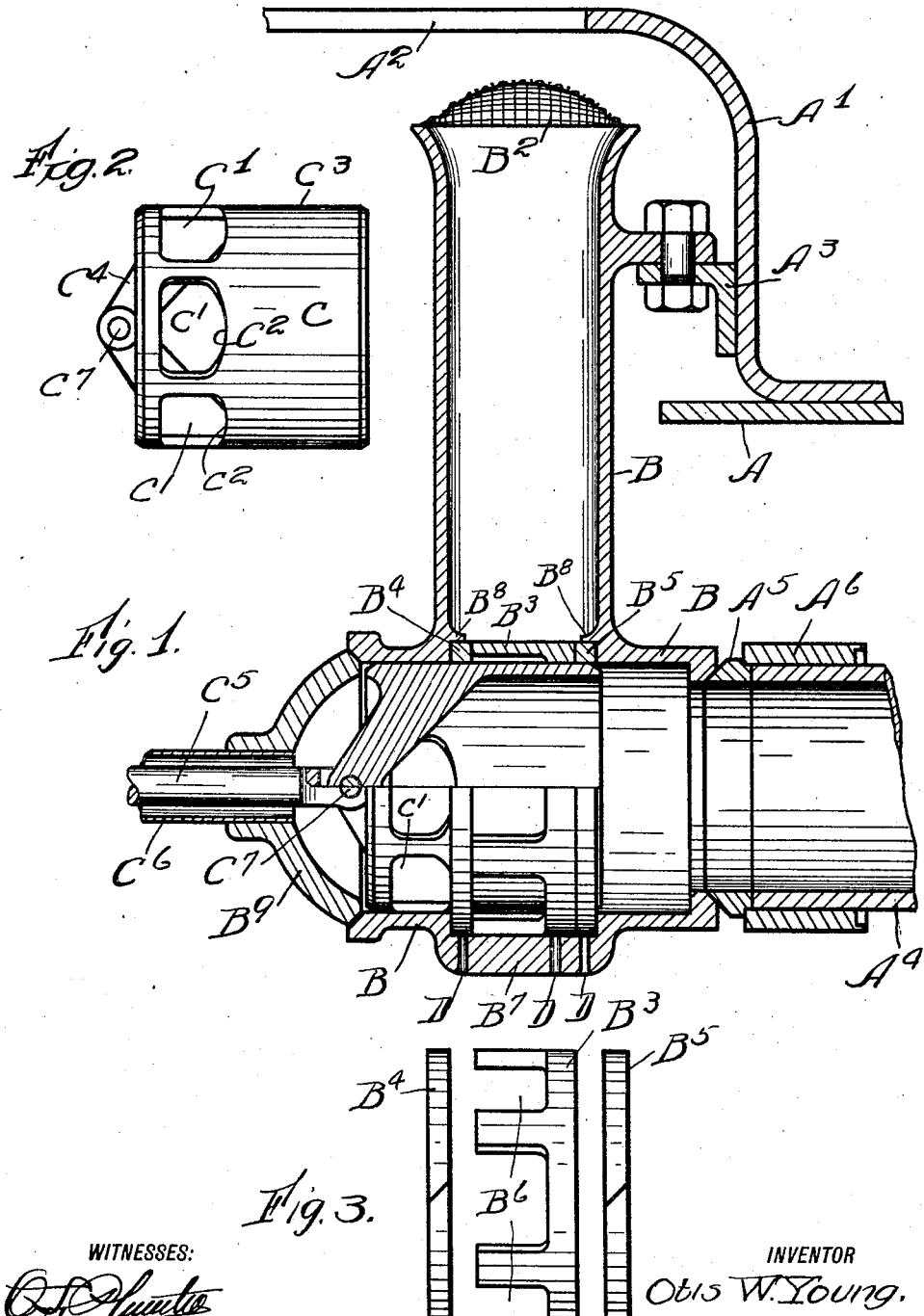
INVENTOR
Otis W. Young.

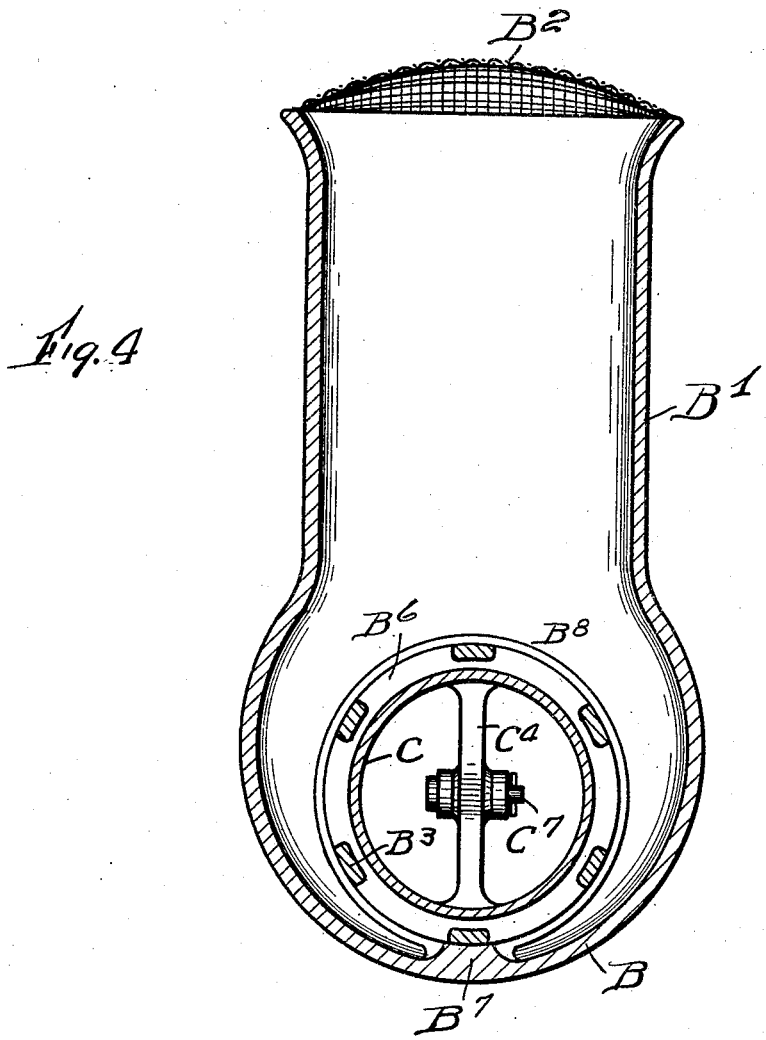

UNITED STATES PATENT OFFICE.

OTIS W. YOUNG, OF CHICAGO, ILLINOIS, ASSIGNOR TO PYLE-NATIONAL ELECTRIC HEADLIGHT COMPANY, OF CHICAGO, ILLINOIS, A CORPORATION OF NEW JERSEY.

THROTTLE-VALVE.

1,304,724.    Specification of Letters Patent.    Patented May 27, 1919.

Application filed January 15, 1915. Serial No. 2,338.

*To all whom it may concern:*

Be it known that I, OTIS W. YOUNG, a citizen of the United States, residing at Chicago, in the county of Cook and State of Illinois, have invented a certain new and useful Improvement in Throttle-Valves, of which the following is a specification.

My invention has to do with a steam throttle valve and while my valve is applicable and appropriate for any situation wherein steam or gas or vapor or even liquids at high temperature are to be controlled, nevertheless, it is peculiarly well suited to service in a locomotive steam engine. Among the objects of my invention are to provide a valve which will work easily, retain its accuracy, be steam tight, automatically close when unlatched, is easily manipulated either to open or close, is accurate and can be closely adjusted or regulated. Many other objects of my invention will appear from time to time in the specification. It is illustrated more or less diagrammatically in the accompanying drawings, wherein—

Figure 1 is a section through the valve housing and a part of the locomotive boiler showing the valve partly in section;

Fig. 2 is a detailed side elevation of the valve;

Fig. 3 is a detailed side elevation of packing and spacing rings; and

Fig. 4 is a section through the valve and housing at right angles to Fig. 1.

Like parts are indicated by like letters throughout the several figures.

A is a steam boiler shell. Mounted upon it is the steam dome $A^1$ having the manhole $A^2$ normally closed. $A^3$ is a bracket within the steam dome to furnish a support for a portion of the weight of the throttle valve. $A^4$ is a dry steam pipe which leads to the cylinders not here shown. $A^5$ is a gasket at the end of the pipe. $A^6$ is a yoke surrounding the end of the pipe and in engagement with said gasket and adapted to clamp by any suitable means not here shown the gasket, the pipe and the throttle valve housing B all together in suitable operative fixed relation so as to make a steam tight joint between the pipe and the gasket and the gasket and housing. The housing or throttle valve casing is substantially closed at one end and has an upward extension or steam pipe $B^1$ surmounted at the top by a netting $B^2$ and surrounding the filling piece or spacing ring $B^3$. This filling piece or spacing ring has at either end a compression packing ring $B^4$, $B^5$ and is ported as at $B^6$. It is held in position by the lug $B^7$ projecting upwardly from the bottom of the housing or casing B and the flanges $B^8$ which support the rings and assist them in positioning the piece $B^3$. $B^9$ is a cover removably mounted on and closing the housing or casing B and held in position to make a steam tight joint by any suitable means not here shown.

C is a valve sleeve or cylinder. It is mounted within the housing B and is slidably supported by the loose or floating filling piece $B^3$ and yieldingly gripped by the compression rings $B^4$, $B^5$. It may or may not rest upon the bottom of the housing B depending on the thickness of the rings and filling piece but preferably would be slightly out of contact with the housing. If in contact with the housing, the housing would serve as cylindrical bearing surfaces for said sleeve or cylinder. This sleeve is provided at one end with ports $C^1$ having the forwardly extending curved edges $C^2$ and has the broad closed surface at $C^3$ where the valve is shown in the closed position obstructing the ports $B^6$. $C^4$ is a stiffening or reinforcing web within the valve sleeve. $C^5$ a valve stem free to reciprocate within a valve stem tube guide or guard $C^6$ and connected by means of a knuckle joint $C^7$ with the web $C^4$. The valve stem actuating means and the packing or guiding member between it and the housing or pipe $C^6$ are not here shown or illustrated.

D are live steam passages through the wall of the housing into the aperture beneath the packing rings and the filling piece to admit a small quantity of live steam which will compress the rings upon the sleeve and assist the normal yielding spring action of the rings in gripping the cylinder to make the steam tight sliding joint.

It will be evident that while I have shown in my drawings an operative device, still many changes might be made both in size, shape and arrangement of parts without departing from the spirit of my invention, and I wish, therefore, that my drawings be regarded as in a sense diagrammatic.

The use and operation of my invention are as follows:—

With the parts in the position shown, the operator would thrust the valve stem forwardly a small distance and this would crack the port. Steam would then be drawn from the upper portion of the dome through the wire netting and down the wide passage to the valve cage. It would then pass through a comparatively narrow opening where the curved edge of the valve port projects from the packing ring and thence through the valve cylinder and the dry pipe to the engine, this for the purpose of just breaking the vacuum when the engine is drifting. When it is desired to furnish more power the valve stem may be pushed farther forward until the steam passage is open. It will be noted that the pipe leading from the top of the valve to the dome is much larger than the dry pipe so that the velocity therein will be comparatively low and thus the velocity in the net will be low and since the top of the pipe is curved outwardly to deflect any water or vapor an unusually dry steam will be drawn into the dry pipe. Since the valve is connected by a straight line pull with the valve stem, it will be obvious that the valve responds directly in position to the stem and so the valve can be very nicely adjusted and very close control may be had by the operator. In its operation the valve sleeve, of course, slides back and forth within the housing and the valve seat, viz: the valve contacting surfaces of the packing rings and the spacer are not exposed. The result is that the valve always has a smooth bearing and any particles which might be deposited on the bearing are scraped or rubbed off and the valve seat is kept clean and smooth and thus it is always kept steam tight. Moreover, since the packing rings float in the casing, the casing can change, owing to contraction and expansion, both in size and shape without interfering with the shape of the rings or their position with respect to the valve sleeve.

It will be noted that the valve stem or rod projects out through the wall (not shown) of the boiler and is unbalanced and therefore pressure on the inner end of the rod will be sufficient to cause the valve normally to tend to close when unlatched to respond to this pressure. This pressure will, of course, to a certain extent be resisted by the forward movement of the steam through the valve sleeve toward the dry pipe, but experience shows that this frictional drag of the steam on the valve sleeve is not sufficient to overcome the unbalanced pressure of the valve stem and accordingly the valve is normally closed.

I claim:

1. In a throttle valve for locomotives the combination of a cylinder open at both ends and ported about its entire circumference, means for moving it longitudinally, a housing closed at one end and having cylindrical bearing surfaces upon which the cylinder slides, a steam pipe connected to said housing and communicating with one of the open ends of the cylinder, said housing having a steam passage surrounding the cylinder intermediate the said bearing surfaces, compression spring packing rings surrounding and in slidable engagement with the cylinder and located adjacent the respective bearing surfaces, a spacing ring surrounding the cylinder interposed between the packing rings and ported about its entire periphery in register with the steam passage surrounding the cylinder, said spacing ring bearing against said cylinder.

2. In a throttle valve for locomotives the combination of a cylinder open at both ends and ported about its entire circumference, means for moving it longitudinally, a housing closed at one end and having cylindrical bearing surfaces upon which the cylinder slides, compression spring packing rings located adjacent the respective bearing surfaces and in slidable contact with the cylinder, a spacing sleeve between said rings, said sleeve ported about its entire circumference and in slidable contact with the cylinder, a steam pipe connected to said housing and communicating with one of the open ends of the cylinder, said housing having a steam passage surrounding the spacing sleeve, the ports of said valve cylinder adapted to register with the ports of the spacing sleeve when the valve is open.

In testimony whereof I affix my signature, in the presence of two witnesses, this 11th day of January, 1915.

OTIS W. YOUNG.

Witnesses:
 BESSIE S. RICE,
 MINNIE M. LINDENAU.

Copies of this patent may be obtained for five cents each, by addressing the "Commissioner of Patents, Washington, D. C."